Patented Oct. 11, 1932

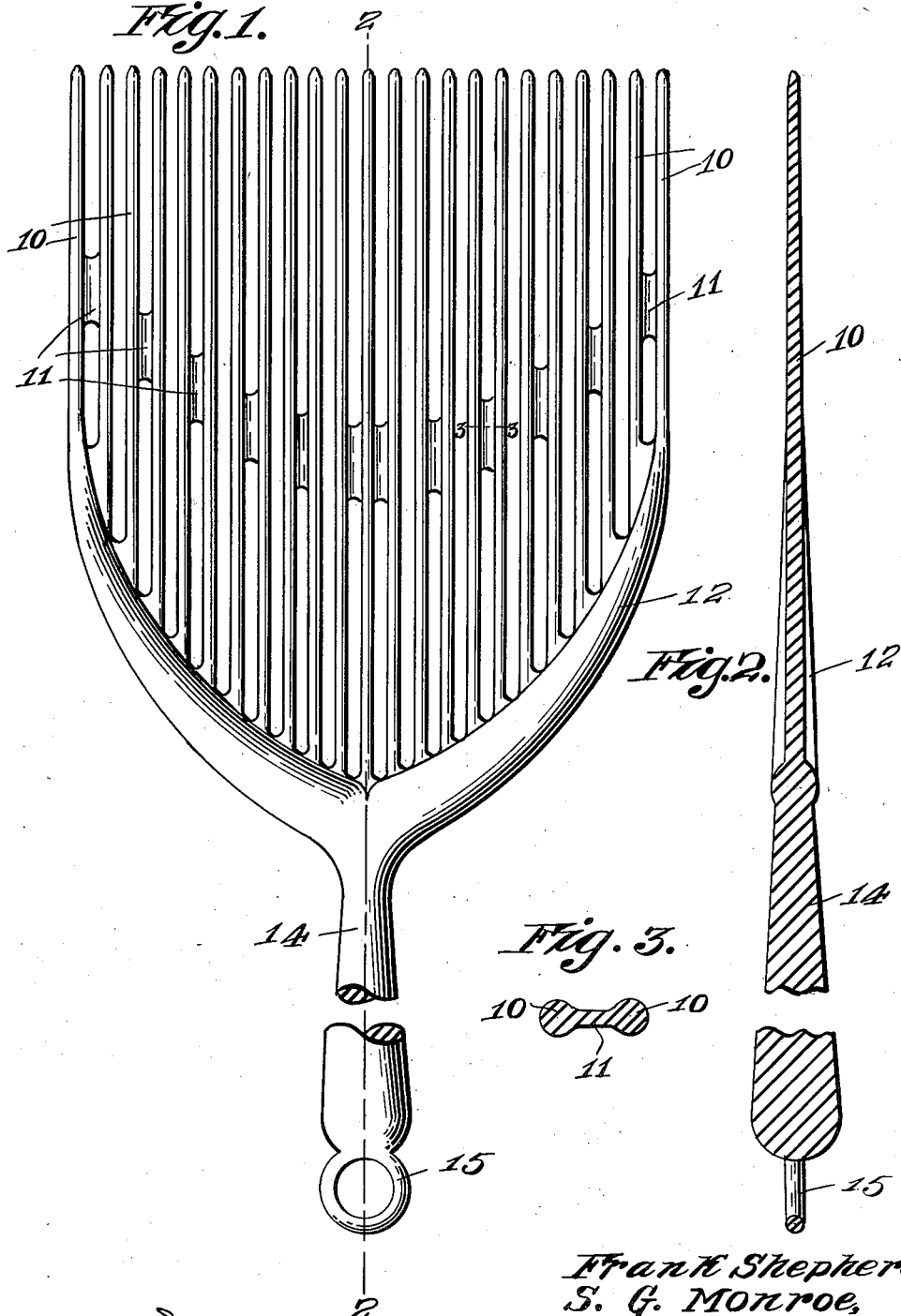

1,882,291

UNITED STATES PATENT OFFICE

STANLEY G. MONROE AND FRANK SHEPHERD, OF AKRON, OHIO

FLY SWATTER

Application filed December 7, 1931. Serial No. 579,532.

The object of this invention is to provide a fly swatter so constructed that the fingers or tines will readily bend and immediately assume their original shape, thus making it possible to effectively kill the fly, whether he be in a corner or on some other place ordinarily inaccessible by means of the conventional fly swatter; to provide a fly swatter, in which the fingers or tines are flexible as well as resilient; and to provide a fly swatter which is of simple form and, therefore, susceptible to cheap manufacture.

With this object in view the invention consists in a construction and combination of parts of which a preferred embodiment is illustrated in the accompanying drawing but to which, however, the invention is not to be restricted further than is imposed by the appended claims.

Figure 1 is a plan view of the invention.

Figures 2 and 3 are sectional views on the planes indicated by the lines 2—2 and 3—3 respectively, of Figure 1.

The invention comprises a series of fingers or tines 10 arranged in spaced parallel relation. These fingers are made preferably of soft rubber, and certain adjacent fingers are connected by means of an integral web portion 11 which extends only for a limited distance in the direction of the length of the fingers. In the illustrated embodiment every other pair of fingers are connected by means of a web and this construction has the effect of keeping the device as a whole in shape. Each pair of fingers, by reason of the web, being maintained in the same relative position with reference to other pairs of fingers, as if they were one finger of larger cross section and either of the two individual.

The fingers are formed as an integral part of the yoke 12 with which the handle 14 may also be integrally formed, although a metallic or wooden handle may be applied to the yoke as a means for handling the device. At the free end of the handle 14 an eye 15 is provided by which the device may be hung on a support. In the illustrated embodiment the eye is formed as an integral part of the handle. The whole device is preferably constructed of soft rubber and by reason of this fact will not scratch or mar furniture nor will it crush the insects being killed. Further by reason of the pliability of the fingers flies on the corners or edge of furniture may be readily reached and further it is sanitary in that it can be readily washed in water or disinfectant without likelihood of impairment.

Having described the invention, what is claimed as new and useful is:

1. A fly swatter comprising a plurality of spaced parallel fingers, formed of a material of the character of soft rubber and webs connecting certain adjacent fingers at intermediate points.

2. A fly swatter comprising a plurality of spaced parallel fingers, a yoke member integral with and spanning all of the fingers at one end and a handle connected with the yoke member.

3. A fly swatter comprising a plurality of spaced parallel fingers, a yoke member integral with and spanning all of the fingers at one end and a handle connected with the yoke member, the handle being integral with the yoke member and the whole device being formed of a material of the character of soft rubber.

In testimony whereof we affix our signatures.

FRANK SHEPHERD.
STANLEY G. MONROE.